United States Patent [19]

Adams

[11] Patent Number: 5,000,902

[45] Date of Patent: Mar. 19, 1991

[54] METHOD OF MOULDING AN ARTICLE

[75] Inventor: Alfred A. Adams, Bungay, England

[73] Assignee: Group Lotus Plc, England

[21] Appl. No.: 315,234

[22] Filed: Feb. 23, 1989

Related U.S. Application Data

[63] Continuation of Ser. No. 817,719, Jan. 10, 1986, abandoned.

[51] Int. Cl.[5] ...................... B29C 45/16; B29C 41/22
[52] U.S. Cl. .................................... 264/510; 264/245;
    264/255; 264/308; 264/309; 264/512
[58] Field of Search ............. 264/74, 245, 255, 297.4,
    264/308, 309, 331.11, 510, 571, 77, 512

[56] References Cited

U.S. PATENT DOCUMENTS

| | | | |
|---|---|---|---|
| 2,063,315 | 12/1936 | Kuettel | 264/308 |
| 3,773,886 | 11/1973 | Starr et al. | 264/245 |
| 3,809,733 | 5/1974 | Sandiford et al. | 264/255 |
| 4,551,390 | 11/1985 | Canning et al. | 264/255 |
| 4,615,057 | 10/1986 | Fanseau | 264/255 |

FOREIGN PATENT DOCUMENTS

| | | |
|---|---|---|
| 50807 | 7/1959 | Australia . |
| 26137 | 9/1972 | Australia . |
| 55638 | 2/1980 | Australia . |
| 43026 | 11/1985 | Australia . |
| 2247702 | 9/1972 | Fed. Rep. of Germany . |
| 2346800 | 4/1975 | Fed. Rep. of Germany . |
| 2742188 | 3/1978 | Fed. Rep. of Germany . |
| 18219 | 5/1964 | Japan ............ 264/245 |
| 310311 | 12/1955 | Switzerland . |
| 1190974 | 5/1970 | United Kingdom ........ 264/245 |
| 1399472 | 7/1975 | United Kingdom ........ 264/245 |
| 1432333 | 4/1976 | United Kingdom . |
| 2013132 | 8/1979 | United Kingdom . |
| 2057338 | 4/1981 | United Kingdom . |
| 2079667 | 1/1982 | United Kingdom . |

Primary Examiner—James B. Lowe
Attorney, Agent, or Firm—Seidel, Gonda, Lavorgna & Monaco

[57] ABSTRACT

A method for moulding an article wherein mould parts are adapted to be moved together under vacuum to cause moulding material to be evenly distributed around a reinforcement structure. A finish coating of paint or the like is applied to the article during the moulding process by coating the mould interior and partially curing the coated material before introduction of the moulding material. Coating of the interior of one or both mould parts may be effected to produce articles coated on one or both surfaces. If desired, a plurality of coating and partial curing steps may be employed.

39 Claims, 1 Drawing Sheet

METHOD OF MOULDING AN ARTICLE

"This is a continuation of co-pending application Ser. No. 817,719, filed on Jan. 10, 1986, now abandoned".

BACKGROUND TO THE INVENTION

1. Field of the Invention

The inventions lies in the field of moulding and is particularly but not exclusively concerned with the moulding of an article in synthetic resin material, with or without a reinforcement structure, for example fibre reinforcement.

2. Description of the Prior Art

United Kingdom Patent Specification GB 1 432 333 discloses a method of moulding an article, the method having the step of applying a vacuum to a cavity defined between separate male and female mould parts having sealing means therebetween, the cavity containing a hardenable liquid moulding material, thereby drawing the mould parts together with relative movement thereof at at the sealing means, and causing the moulding material to flow in the cavity into the shape of the article to be moulded.

The specification referred to also discloses a mould for moulding an article, the mould comprising a male and female mould part shaped to be assembled to define a cavity therebetween, a seal for sealing the cavity against atmosphere, and an aperture in one of the mould parts for application of a vacuum to the cavity, the mould parts and the seal being arranged to permit drawing of the mould parts together with relative movement thereof at the seal, and flow of hardenable liquid mould material in the cavity into the shape of the article to be moulded, in response to the application of the vacuum to the cavity.

It is an object of the present invention to provide a moulding method whereby a finish coating of a moulded article can be applied to the article in the course of the moulding operation.

It is a further object to provide a moulding method whereby an outer paint or lacquer layer of a moulded article is applied to a mould wall and is subsequently incorporated into the moulded article as a surface layer.

It is yet another object of the invention to provide a moulding method whereby a layer destined to be a surface layer of a moulded article is partially cured in a mould cavity prior to addition of further mouldable material and further curing of the partially-cured layer.

SUMMARY OF THE INVENTION

The present invention provides a method of moulding an article in a mould, said mould having mould cavity walls defining a mould cavity conforming to the shape of said article and said method comprising the steps of:

(a) applying to at least a portion of said mould cavity walls a layer of a curable material in liquid form destined to form a surface layer of said article;

(b) effecting partial curing of said surface layer forming curable material;

(c) introducing to said mould cavity a curable moulding material, said partial curing being sufficient to prevent bleeding of subsequent layers into the surface layer of curable material destined to be moulded to form said article;

(d) effecting further curing of said surface layer forming curable material and curing of said curable moulding material at least to an extent permitting removal of the moulded article so produced from the mould cavity;

(e) maintaining the mould at a temperature in the range of from about 18° C. to about 40° C. during preceding steps (a)-(d); and (f) removing said article from said mould cavity.

Preferably, said steps (a) and (b) comprise the steps of applying to said mould cavity wall successive layers of first and second different surface layer forming curable materials, partial curing of said layer of said first material being effected prior to said application of said layer of said second material which is subsequently partially cured.

More preferably, said steps (a) and (b) comprise the further steps of applying and partially curing at least one further layer of surface layer forming curable material.

In any case, the said layers can be applied as two or more sub-layers, without significant curing between the applications thereof.

The surface layer forming material or materials may be clear, transparent lacquers (e.g. a polyurethane resin) or may be pigmented. In particularly preferred methods, a first surface layer forming material is a clear lacquer and a second material, applied after partial curing of a layer of the first material, is pigmented. If desired, one or more further pigmented layers can be applied, each after partial curing of the immediately preceeding layer.

The total thickness of the surface layer is preferably in the range of from 0.005 in to 0.033 in and more preferably in the range from 0.015 in to 0.023 in.

DESCRIPTION OF THE PREFERRED EMBODIMENT

Figure 1:
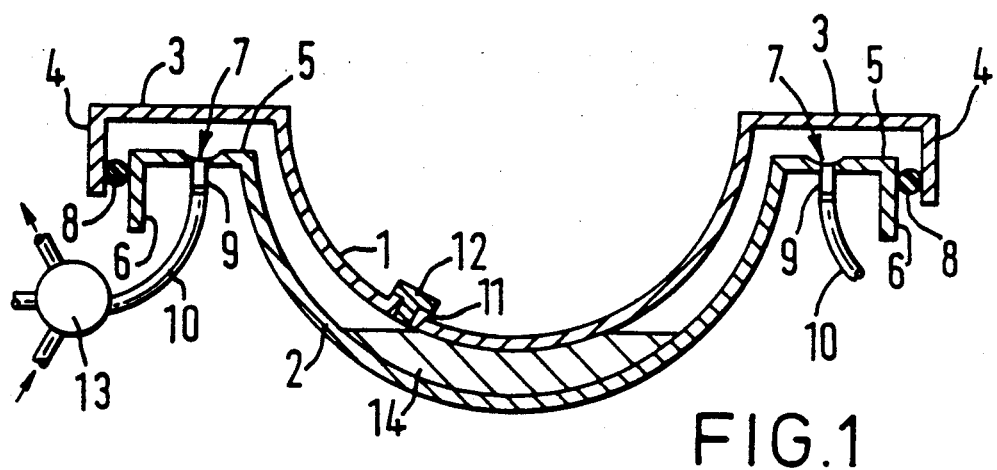
FIG. 1 is a cross section through a mould for performing the method of the invention in an "oversize" state and with the material to be moulded introduced.

Referring first to FIG. 1, the mould comprises a male part 1 and a female part 2 which, as shown, are shaped for the moulding of an article of simple hemispherical shape. It will be appreciated that the mould parts can be of any desired shape to define between them a cavity having the shape of the article it is desired to mould.

The male mould part 1 has, as its uppermost part in the position shown in the drawings, an outwardly extending annular flange 3 which at its outer edge is bent downwardly to form an annular skirt 4. The female part also has a flange 5 bent downwardly to form an annular skirt 6, the flange 5 being formed with a circular groove 7. A sealing ring 8 of rubber or other resilient material is disposed between the overlapping skirts 4 and 6 and is secured to one or the other skirt, preferably the skirt 6. A connection 9 for a vacuum pipe 10 is secured to the flange 5 to open into the groove 7.

At its lowest point the male mould part 1 has an inlet orifice for resin surrounded by a tubular boss 11 into which fits a shouldered stopper 12 the inner end of which is shaped to conform to the curvature of the inner surface of the male mould part so that when the stopper is fully inserted with its shouldered part firmly abutting the edge of boss 11 there is a minimum of discontinuity of the inner surface of mould part 1 at the position of the inlet orifice.

The mould parts are separable from each other and to overcome the frictional resistance to separating movement resulting from the sealing ring 8 it is convenient to include in vacuum pipe 10 a multiway valve 13 of conventional construction which can be manipulated between positions in which it respectively applies vacuum, air or gas under pressure, and connection to atmosphere to the pipe 10, so that by manipulation of the valve the mould parts 1 and 2 can be forcibly separated by air under pressure introduced between them through pipe 10.

The use of the illustrated mould to mould an article is generally in accordance with the teaching of British Patent Specification 1 432 333, the contents of which are incorporated herein by reference, but in accordance with the present invention the mould is employed to produce a moulded product complete with a surface coating of paint or other finishing material. Thus in accordance with the invention, prior to establishment of the FIG. 1 situation, the moulding surface of the open female mould part 2 is first provided with a coating of release agent or polish, after which one or more layers of curable pigmented or non-pigmented curable material are sprayed onto the coated mould part or parts. After an appropriate partial curing period, one or more further curable layers are sprayed onto the initial layer or layers. Any required reinforcement structure is then positioned in the mould, and the male mould part 1, also coated with a polish and/or release agent, and treated similarly to the female mould part if the product is to be painted on both sides, is placed in position in the female mould. The resin inlet orifice is closed by the stopper 12 and the valve 13 is then operated so that vacuum from the vacuum source is applied to the volume between the mould parts to draw them together to an initial or "oversized" position shown in FIG. 1. During this operation skirt 4 rides over sealing ring 8 maintaining a sliding seal around the whole periphery of the mould. Valve 13 is now operated to release the vacuum inside the mould and the stopper 12 is removed. A measured quantity of freshly mixed thermosetting resin sufficient to form the article to be moulded is now entered into the mould through the inlet orifice uncovered by the removal of stopper 12 and the stopper is replaced and pushed firmly into engagement with boss 11. The resin introduced collects in the lower part of the oversize mould cavity as indicated at 14 in FIG. 1.

The valve 13 is again operated to apply vacuum to pipe 10 and this causes the mould parts 1 and 2 to be drawn towards each other, skirt 4 of mould part 1 sliding over sealing ring 8 to permit such drawing together while maintaining the sealed condition of the mould. As the mould parts move towards each other they squeeze the collection of resin 15 so that it spreads upwardly through the diminishing mould cavity until it reaches the level of the flange 5 of mould part 2. During this squeezing action the application of vacuum can be regulated to ensure a smooth and even spread of the resin. This may be facilitated by having the male mould part formed of translucent material and ensuring that there is a detectable colour difference between the appearance of the mould where it does not contain resin and where it does contain resin. The level of vacuum required to squeeze the resin to completely fill the effective mould cavity is maintained for a period known, from the properties of the resin mix used, to be sufficient to allow the resin to set to a state where the vacuum can be released.

Figure 2:
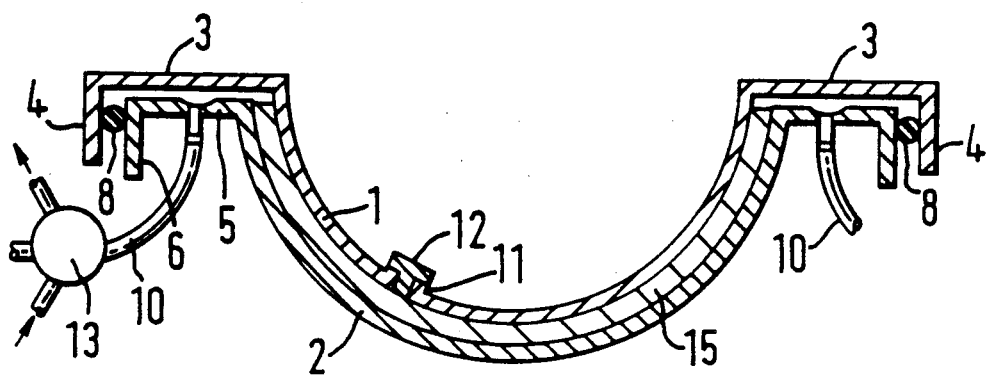
FIG. 2 is a section similar to that of FIG. 1 with the mould in fully closed state.

To remove the finished, moulded article 15 (FIG. 2) from the mould, the valve 13 is operated to apply air under pressure to line 10 and the mould parts 1 and 2 are thus forced apart until skirt 4 is free of sealing ring 8. Thereupon the air pressure can be switched off, the mould part 1 lifted off the mould part 2 and the article lifted out of the mould.

The dwell period required before the mould can safely be opened to release the moulded article depends upon the rate at which the resin mix used will set to form-sustaining state. Since however the process time from the point of mixing the resin to the point where the resin reaches the top of the mould cavity need only be a few minutes, fast-curing resins can be employed and the mould can thus be free for re-use in a relatively short time.

It will be appreciated that the method of the invention provides accurate control of the reinforcement to resin ratio and the wall thickness in the article being moulded and in the case of a "sandwich" type of article i.e. one having a core of different material between two skins of resin, the accuracy extends to both skins since these are formed simultaneously in a single moulding operation.

Variation of these factors can readily be effected either by varying the quantity of reinforcement used with a given quantity of resin, or varying the quantity of resin introduced for a given quantity of reinforcement positioned in the mould.

It will further be noted that the article moulded can have its surface coating of lacquer or pigment applied to both its surfaces simultaneously in the one operation.

EXAMPLES

The following examples are of processes according to the present invention for the production of moulded products complete with surface coatings.

Example 1

The following materials were used in the formation of a clear outer surface layer:

| | |
|---|---|
| IP Lacquer 9156 c 8020 | 2 parts |
| IP Catalyst 2000 2 0176 | 1 part |
| IP Flow Control Agent SR 82 D1/B | 2% |
| Thinners: 2000 6 0178 to give 18s BS4 cup | |

The following materials were used in the formation of a pigmented surface sub-layer: Colour gel: IP blue metallic gel SR D2 B2 with ethyl acetate to give 30s BS4 cup. Catalysed by 2% BUTANOX M50 Back-up gel: IP white gel 5619 Y 0005 catalysed by 2% BUTANOX M50 The materials designated "IP" are available from International Paints.

The following were used in forming the moulded article:

| | |
|---|---|
| Glass mat | VETROTEX CSM M1-20 450 gm$^{-2}$ |
| | VETROTEX CFM U814 450 gm$^{-2}$ |
| Epoxy resin | Ciba Geigy LY 1927 GB |
| | Ciba Geigy HY 1927 GB |
| Foam beams | BAXENDEN DP 8124. |

"VETROTEX" materials are available from Vetrotex International of Geneva, Switzerland.

The walls of the cavity of a mould having male and female parts were prepared for moulding by coating the male part with ALCOSIL mould release agent and by applying one coat of POLYWAX polish to the female part and buffing the wax coat to a high gloss.

The following operations were then carried out:

| Operation | Approx. time in minutes |
| --- | --- |
| (1) Transfer male and female tools to 40° C. oven. | |
| (2) Preheat tools in 40° C. oven | 120 minimum |
| (3) Transfer female tool to spray booth. | |
| (4) Apply lacquer dust coat. | |
| (5) Lacquer dust coat flash off | 5 |
| (6) Apply lacquer dry coat (1 to 2 thou thick) | |
| (7) Lacquer dry coat flash off | 10 |
| (8) Apply lacquer wet coat (1 to 2 thou thick) | |
| (9) Lacquer wet coat flash off | 15 |
| (10) Transfer to 40° C. oven. | 50 |
| (11) Transfer female tool to gel spray booth. | |
| (12) Cool | 10 |
| (13) Apply metallic gel 'heavy' dust coat. | |
| (14) Metallic gel heavy dust coat flash off | 5 |
| (15) Apply metallic gel 4–6 thou | |
| (16) Metallic gel coat cure | 60 |
| (17) Apply back up gel 14–16 thou | |
| (18) Back up gel cure (Includes 30 mins. at 40° to regain temperature.) | 60 |
| (19) Load tool with glass patterns maintaining 40° C. | |
| (20) Close tools (Male tool at 40° C.) | |
| (21) Inject resin at 10–12" Hg vacuum. (All materials/equipment/ mould etc. to be at 40° C. during shot.) | |
| (22) Cure at 40° C. | 8–9 hours |

Example 2

The materials of example 1 were used with the exception that the epoxy resin was replaced by the following polyester resin:

IP 5567 c 8106+1 to 2% TRIGONOX, giving a 30 minute gel time.

The mould preparation steps and moulding operation of example 1 were then repeated with the modification that the resin was injected at a mould temperature of 18° to 21° C. and cured at room temperature for 90 minutes.

Example 3

The materials of example 2 were used with the exception that the following polyester resin was substituted for the resin of example 2:

IP 5567 c 8116+2% TRIGONOX, giving a 10 minute gel time.

The further steps of example 2 were carried out with the modification that the curing period was reduced to 30 minutes.

The terms "dust coat", "dry coat" and "wet coat" mentioned above refer to the appearance of the sprayed coating after spraying, the different appearances being obtained by variation of the speed with which the spray gun is passed over the surface being sprayed. In all of the above instances, the coating is applied in liquid form. This is evident, for example, from the "flashing off" of solvents after the coating has been applied.

The examples given relate to processes in which only the female mould part is treated in accordance with the invention: in modified processes both parts can be so treated.

It will be appreciated that steps (4) to (10) of the examples constitute the application, in liquid form, and partial curing of a first surface layer, steps (13) to (16) application, in liquid form, and partial curing of a second surface layer and steps (17) and (18) application, in gel form, and partial curing of a third surface layer.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

I claim:

1. A method of moulding an article in a mould, said mould having mould cavity walls defining a mould cavity conforming to the shape of said article and said method comprising the steps of:
    (a) applying to at least a portion of said mould cavity walls a layer of a first curable material in liquid form to form a clear, outer surface-coating layer of the moulded articles;
    (b) effecting partial curing of said layer of said first curable material;
    (c) applying to said partially-cured layer of said first curable material, a layer of a second curable pigmented material in liquid form to form a pigmented inner surface-coating layer of said moulded article;
    (d) effecting further curing of said layer of said first curable material and partial curing of said layer of said second curable material;
    (e) introducing into said moulded cavity a curable moulding material to form a body of said moulded article;
    (f) effecting further curing of said layer of said second curable material and curing of said body-forming curable moulding material at least to an extent permitting removal from the mould cavity of the moulded article comprising said body and said surface-coating layers;
    (g) maintaining said mould at a temperature in the range of from about 18° C. to about 40° C. during preceding steps (a)–(f); and
    (h) removing said article from said mould cavity.

2. The method of claim 1 wherein said first material is a polyurethane resin.

3. The method of claim 1 wherein said curable moulding material is a polyester resin.

4. The method of claim 1 wherein said curable moulding material is an epoxy resin.

5. The method of claim 1 wherein step (e) includes introduction to the mould interior of reinforcing means which are incorporated into the body-forming curable material to reinforce said moulded article.

6. The method of claim 1 wherein said mould has male and female mould parts, to one of which said layer of curable material is applied.

7. The method of claim 1 wherein said mould has male and female mould parts, to both of which said layer of curable material is applied.

8. The method of claim 1, wherein said surface layer of said article is formed to a thickness in the range of from 0.005 inches to 0.033 inches.

9. The method of claim 1, wherein said surface layer of said article is formed to a thickness in the range of from 0.015 inches to 0.023 inches.

10. The method of claim 1 wherein at least one of said first and said second curable materials is applied in a plurality of applications of sublayers of said material.

11. The method of claim 1 wherein said first and second curable materials are applied by spraying.

12. The method of claim 1 wherein said steps (a) to (d) comprise the further steps of applying and partially curing at least one further layer of surface-layer forming curable material.

13. The method of claim 12 wherein said further layer is of pigmented material and is applied after said application and partial curing of said first curable material.

14. A method of moulding an article in a mould, said mould having mould cavity walls defining a mould cavity conforming to the shape of said article and said method comprising the steps of:
    (a) spraying at least a portion of said mould cavity walls with a layer of a first curable material in liquid form to form a clear, outer surface-coating layer of the moulded articles;
    (b) effecting partial curing of said layer of said first curable material, said partial curing being sufficient to prevent bleeding of subsequent layers into said layer of said first curable material;
    (c) spraying onto said partially-cured layer of said first curable material, a layer of a second curable pigmented material in liquid form to form a pigmented inner surface-coating layer of said moulded article;
    (d) effecting further curing of said layer of said first curable material and partial curing of said layer of said second curable material, said partial curing of said layer of second curable material being sufficient to prevent bleeding of subsequent layers into said layer of second curable material;
    (e) introducing into said moulded cavity a curable moulding material to form a body of said moulded article and spreading said curable moulding material throughout said mould cavity by creating a vacuum within said cavity;
    (f) effecting further curing of said layer of said second curable material and curing of said body-forming curable moulding material at least to an extent permitting removal of the mould cavity of the moulded article comprising said body and said surface-coating layers;
    (g) maintaining said mould at a temperature in the range of from about 18° C. to about 40° C. during preceding steps (a)-(f); and
    (h) removing said article from said mould cavity.

15. The method of claim 14 wherein said first material is a polyurethane resin.

16. The method of claim 14 wherein said curable moulding material is a polyester resin.

17. The method of claim 14 wherein said curable moulding material is an epoxy resin.

18. The method of claim 14 wherein step (c) includes introduction into the mould interior of reinforcing means for said second curable material.

19. The method of claim 14, wherein the thickness of said first curable material is in the range from about 5 mils to about 33 mils.

20. The method of claim 19, wherein the thickness of said first curable material is in the range from about 15 mils to about 23 mils.

21. The method of claim 19 wherein at least one of said first and said second curable materials is applied in a plurality of applications of sublayers of said material.

22. The method of claim 14 wherein said steps (a) to (d) comprise the further steps applying and partially curing at least one additional layer of surface-layer forming curable material.

23. The method of claim 22 wherein said additional layer of said surface-layer forming curable material is pigmented and is applied after said application and partial curing of said first curable material.

24. A method of forming a multi-layered moulded article, said moulded article being formed in a mould having mould cavity walls defining a mould cavity conforming to the shape of said article, said method comprising the steps of:
    (a) applying to at least a portion of said mould cavity walls a layer of a curable surface material in liquid form to form an outer surface-coating layer of said moulded article;
    (b) partially curing said layer of said curable surface material to form a skin layer of said surface material;
    (c) introducing into said mould cavity a curable body material in liquid form to form a reinforcement body of said moulded article and spreading said curable body material throughout said mould cavity by creating a vacuum within said mould cavity;
    (d) effecting further curing of said skin layer of said curable surface material and at least partially curing said curable body material at least to an extent permitting removal from said mould cavity of said moulded article comprising said skin layer of said surface material and said body of said reinforcement material;
    (e) maintaining said mould at a temperature in the range of from about 18° C. to about 40° C. during said preceding steps (a)–(d); and
    (f) removing said article from said mould cavity.

25. The method of claim 24, wherein the thickness of said first curable material is in the range from about 5 to about 33 mils.

26. The method of claim 25, wherein the thickness of said first curable material is in the range from about 15 mils to about 23 mils.

27. The method of claim 24 wherein said curable surface material is applied in a plurality of applications of sublayers of said surface material.

28. The method of claim 24 wherein said curable surface material is applied by spraying.

29. The method of claim 24 further comprising the step of applying and partially curing at least one additional layer of said curable surface material, wherein said further step is performed after step (b) but before step (c).

30. The method of claim 29 wherein said at least one additional layer of said curable surface material is pigmented.

31. A method of moulding a multi-layered article in a mould comprising a male portion and a female portion which defines a mould cavity conforming to the shape of said multi-layered moulded article, said method comprising the steps of:
- (a) establishing said male portion and said female portion of each mould each at a temperature in the range of from about 18° C. to about 40° C.;
- (b) spraying at least one layer of a first curable material in liquid form, wherein said first curable material comprises a solvent material, onto the inside mould wall of one of said mould portions;
- (c) maintaining said one portion of said mould at a temperature in said range to at least partially cure said at least one layer of said first curable material and form a first surface;
- (d) spraying at least one layer of a second curable material in liquid form onto said first surface;
- (e) maintaining said one portion of said mould at a temperature in said range to at least partially cure said at least one layer of said second curable material and form a second surface;
- (f) joining said one portion and the other portion of said mould to form a mould cavity between said second surface and said inside mould wall of said other portion;
- (g) introducing into said mould cavity a curable body-forming material in liquid form and spreading said liquid curable body-forming material throughout said mould cavity by creating a vacuum within said mould cavity;
- (h) maintaining said joined male and female portions at a temperature in said range to substantially cure said curable body-forming material and form a multi-layered moulded article; and
- (i) removing said multi-layered moulded article from said mould cavity.

32. A method as in claim 31 wherein said first curable material is substantially transparent.

33. A method as in claim 32 wherein said first curable material comprises lacquer.

34. A method as in claim 31 wherein said second curable material comprises a metallic gel.

35. A method as in claim 31 wherein prior to step (b) at least a portion of said female portion of said mould is coated with a mould release agent and wherein prior to step (f) at least a portion of said male portion of said mould is coated with a mould release agent.

36. A method as in claim 31 wherein after step (b) but before step (c) said method further comprises the steps of spraying of at least one sub-layer of said first curable material onto said at least one layer of said first curable material and evaporating at least a portion of said solvent material from said at least one sub-layer of said first curable material.

37. A method as in claim 36 wherein after step (d) but before step (e) said method further comprises the step of spraying at least one sub-layer of said second curable material onto said at least one layer of said second curable material.

38. A method as in claim 31 wherein after step (d) but before step (e) said method further comprises the steps of spraying at least one sub-layer of said second curable material onto said at least one layer of said second curable material.

39. A method as in claim 31 wherein, prior to step (f), said other mould portion is
- (a) sprayed on the inside mould wall thereof with at least one layer of a first curable material in liquid form, wherein said first curable material comprises a solvent material;
- (b) maintained at a temperature in the range of from about 18° C. to about 40° C. to at least partially cure said at least one layer of said first curable material and form a first surface;
- (c) sprayed on said first surface with at least one layer of a second curable material in liquid form; and
- (d) maintained at a temperature in said range to at least partially cure said at least one layer of said second curable material to form a second surface.

* * * * *